(No Model.)
N. CRANE.
PHOTOGRAPHIC CAMERA.
No. 439,121. Patented Oct. 28, 1890.
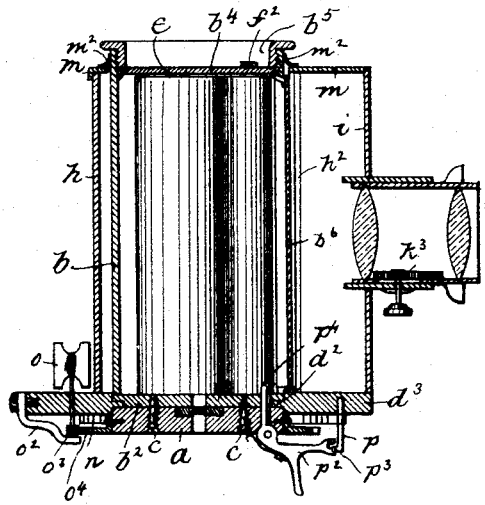
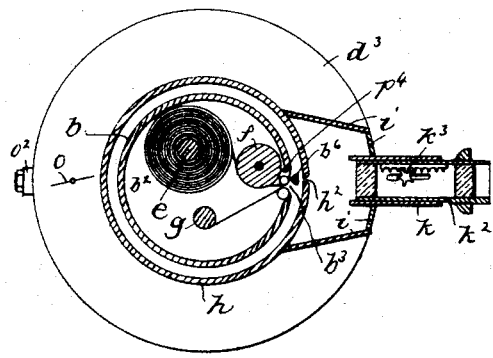
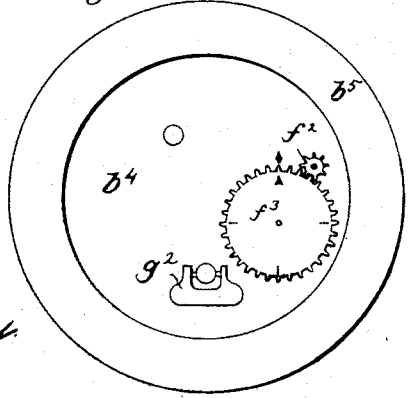
Witnesses.
Jas. J. Maloney
A. J. Locke
Inventor,
Newton Crane
by Jos. P. Livermore
Att'y.

UNITED STATES PATENT OFFICE.

NEWTON CRANE, OF NEWTON, MASSACHUSETTS.

PHOTOGRAPHIC CAMERA.

SPECIFICATION forming part of Letters Patent No. 439,121, dated October 28, 1890.

Application filed December 23, 1889. Serial No. 334,714. (No model.)

*To all whom it may concern:*

Be it known that I, NEWTON CRANE, of Newton, county of Middlesex, and State of Massachusetts, have invented an Improvement in Photographic Cameras, of which the following description, in connection with the accompanying drawings, is a specification, like letters on the drawings representing like parts.

The object of my invention is to produce a camera by which cycloramic views or views comprising the objects surrounding the camera on all sides may be taken, although the objects included in any desired angle may be taken when required.

The invention is embodied in a camera comprising a cylindrical bed or support for the sensitive film and a revolving lens-carrier arranged to rotate around the said bed and to focus upon the film the image of the object at each moment opposite or in front of the lens, so that in a single complete rotation of the lens around the film the images of all the objects surrounding the camera will be successively focused on the film, which when developed will be capable of producing a picture of the objects in the entire field surrounding the camera. If, for example, said camera is set up in a room, a negative of all the objects in the room and on all the four walls thereof would be produced.

To insure the sharp focusing of the objects, a screen is interposed between the lens and the film-support, said screen moving with the lens and having a narrow longitudinal slit through which the light passes to the film, and as the said screen and lens rotate around the film all parts of the surface of the latter will be successively acted upon by the light, so as to produce a complete and continuous representation of the objects around the camera. As the width of the portion of the image at any given moment upon the sensitive film is extremely narrow, the lens may be substantially cylindrical in shape, focusing the image lengthwise of the slit and of the cylindrical film.

The invention further consists in details of construction, which will be hereinafter pointed out.

Figure 1 is a longitudinal vertical section of a camera embodying this invention; Fig. 2, a transverse horizontal section thereof on line $x$ $x$, Fig. 1; Fig. 3, a plan view showing the top of the camera on a larger scale, and Fig. 4 a detail showing the lens-tube in side elevation.

The camera comprises a base $a$, (see Fig. 1,) adapted to be fastened upon the head of a tripod or other suitable support, upon which base is fixed a cylinder $b$, having a bottom plate $b^2$, which may be fastened to the base $a$ by screws $c$ or otherwise, the plates $a$ and $b^2$ thus forming a stationary base which is provided with a circumferential groove that receives a corresponding flange or tongue $d^2$ on a plate $d^3$, surrounding the said base $a$, as shown in Fig. 1. The tongue or flange $d^2$ has a working fit in the groove, so as to retain the annular plate $d^3$ and parts supported upon it steady with relation to the base $a$, while permitting the said plate $d^3$ to rotate around the base $a$, which acts as a center or bearing for it in such rotary movement.

The outer surface of the cylinder $b$ forms the support for the sensitive film upon which the negative is to be taken, and said film may be of cylindrical shape and introduced into the camera and supported on the said cylinder $b$ in any suitable or convenient manner. As herein shown, the sensitive film is on a long web of paper or other thin flexible material wound into a coil upon a spool or spindle $e$, from which it passes over a measuring-roll $f$ and out through a slot $b^3$ in the side of the cylinder, around which it is carried and returned into the said slot, as shown at $b^3$, and connected with another winding spool or shaft $g$, provided with a suitable winding-key $g^2$ (see Fig. 3) outside of the cylinder. The rolls on which the film is thus wound have their bearings in the bottom plate $b^2$ of the cylinder and in the top piece $b^4$, (see Fig. 1,) shown as resting on a shoulder inside the cylinder, and fastened thereto by a threaded annulus $b^5$, which can be unscrewed, in order to disengage the top piece $b^4$ and permit the removal and replacement of the spools when required. The parts $b$ $b^2$ $b^4$ $b^5$ are thus all securely connected together, constituting a light-tight cylinder or drum which can be removed bodily from the rest of the apparatus by unscrewing the screws $c$, and when the parts are in position a band of sensitive material is supported on the outside of the cylinder $b$, extending substantially all around the same, which band or portion can be wound upon the drum $g$ after an exposure has been made, and replaced by another portion which runs off from the drum $e$, while the exposed portion is being wound up, the measuring-cylinder $f$ serving to indicate the proper amount of movement of the winder $g$ $g^2$ in the usual manner, except that in this instance the measuring-roll $f$ is of such size as to take four complete turns for one length of film sufficient to extend around the cylinder $b$, the said drum being provided above the plate $b^4$ with a pinion $f^2$, meshing with a gear $f^3$ with four times the number of teeth, so that one rotation of the gear $f^3$ takes place in the act of winding a sufficient portion of the film to extend once around the cylinder $b$. The gear $f^3$ may be graduated, as shown, so that the winding may be more or less than enough to extend wholly around the drum, in order to provide for cases when it is desired to take a picture of the objects included within a smaller horizontal angle—as, for example, one of ninety degrees or one hundred and eighty degrees, instead of the complete circle.

The images of the objects surrounding the camera are properly focused on the portion of the film supported on the cylinder which is opposite them by the following means or appliances, all of which are connected with the rotating base-piece $d^3$ before mentioned. The said base-piece contains near its inner circumference an opaque drum or shield $h$, which completely surrounds and incloses the cylinder $b$ and sensitive film thereon, except that the said drum $h$ has a very narrow longitudinal slit along one side, as indicated at $h^2$, Fig. 2. The said annular base $d^3$ has also connected with it a wall or shield $i$, in which is supported the lens-tube $k$ containing the adjustable lens-carrier $k^2$, which may be adjusted by the usual rack and pinion indicated at $k^3$, the said lens-tube being opposite the slit $h^2$ in the inner screen and shaped to focus the light from images lying in a vertical strip or band parallel with the axis of the cylinder, so as to produce a corresponding sharp image on the vertical strip or band of the sensitive film to which the light has access through the slit $h^2$. The top of the space between the inner and outer walls $h$ $i$ of the rotating part of the camera is closed by a top plate $m$, which extends nearly to the walls of the cylinder $b$ and is arranged to make a light-tight joint around the said cylinder, being, for example, provided with a flexible washer $m^2$, which prevents entrance of light at this point. Such a light-tight joint is desirable, as it admits of the ready insertion and removal of the drum $b$, although the same result may be attained, if desired, by a suitable joint constructed on the tongue-and-groove plan, like the joint at $d^2$ on the base of the cylinder.

From the foregoing description it will be understood that if when the lens is properly focused the outer revolving part of the apparatus supported on the plate $d^3$ is rotated once around the stationary inner part at substantially uniform speed the images of all the objects around the camera will be successively focused upon the portion of the film which is directly opposite them, as the lens and slit passes between each object or portion of the objects and the sensitive film in its rotation, and consequently the succession of images will produce, practically, a continuous impression upon the sensitive film, which will thus be capable of producing a picture of the objects entirely surrounding the camera.

In order to produce a uniform and sufficiently-rapid time movement of the outer part of the apparatus, it may be acted upon by a spring $n$, (see Fig. 1,) said spring being shown in this instance as a spiral spring below the rotating bottom plate $d^3$ and having one end connected with the said plate and the other end connected with the base-piece $a$, so that the said plate $d^3$ may be turned by hand in the direction to strain the spring, which will then tend to turn the plate in the opposite direction around the base $a$.

The speed of movement of the plate $d^3$ and parts supported upon it under the action of the spring may be controlled by a governor (shown as a fan $o$) having bearings in the bottom plate $d^3$, and a bracket $o^2$, connected therewith, the arbor of said fan being provided with a pinion $o^3$, which meshes with a gear or toothed annulus $o^4$, fastened upon the base-piece $a$. Thus revolution of the arbor of the fan around the stationary base-piece $a$ and gear $o^4$ thereon causes rapid rotation of the fan about its axis and regulates the acceleration of movement of the part $d^3$ and governs its speed in the usual manner.

In order to control the starting and stopping of the rotary movement of the annulus $d^3$, the latter is provided with a stop pin or projection $p$, which engages with a detent or latch $p^2$, fastened to the base-piece, and prevents movement of the part $d^3$ until said detent is disengaged by the operator, when the part $d^3$ will begin to turn under the stress of the spring $n$, which has been previously wound and which will commonly operate to turn the part $d^3$ once around the inclosed cylinder and then stop it. The detent-pin $p$ preferably has an offset finger or projection $p^3$ at its end, which co-operates with two projections on the detent $p^2$, arranged one above the other and the upper one a little offset from the lower one in the direction in which the pin $p$ tends to move when raised. Thus when the detent is depressed the finger $p^3$ escapes from the lower projection of the detent, but is caught by the upper one, and is then completely released only when the detent $p^2$ returns to its original position, in which the lower projection is ready to stop the pin $p$ when it has made one complete revolution. If desired, however, the bottom plate $d^3$ may have openings spaced at different points to receive a movable stop-pin, which can be placed in any one of said openings, so as to stop the movement of the part $d^3$ and lens after it has traversed any desired horizontal angle.

The main stop-pin $p$ and detent are located to normally stop the outer part of the camera with the lens and the slit $h^2$ in the screen opposite the point where the film passes out from and back into the interior of the inner cylinder, and a portion or strip $b^6$, connected with the inner cylinder $b$, covers the space opposite the slit, so that the light cannot enter the cylinder and act on the sensitive film if the lens should be uncapped.

The detent $p^2$ is provided with an arm $p^4$, extending up into the cylinder in such position that when the detent is moved to release the lens-carrier, so as to make an exposure, the said arm $p^4$ pricks a small hole in the edge of the film-strip at the point where the exposure begins, so as to make a guide for cutting up the film-strip after all the exposures have been made. By having the gaging-mark pricked by the detent in this manner it will always be in the right position, whether the exposure has taken in the full three hundred and sixty degrees around the camera or any desired fraction thereof, it being necessary only to always begin the exposure from the point opposite the detent and to wind off from the reel $e$ just before each exposure enough to cover only the angle to be taken, such amount being determined by the gaging-wheel $f^3$ at the top of the cylinder.

The lens may be of any construction; but as the transverse width of the image to be formed on the sensitive film at any given moment is extremely narrow the lens may be substantially cylindrical in shape, as shown, focusing the image up and down the slit in the usual manner.

It is obvious that the proportions and mechanical construction of the apparatus may be widely varied without departing from the invention, and that a substantially similar construction and mode of operation may be adopted in cases where it is desired to include less than the entire circle around the camera in the field thereof, the main novelty in the mode of operation being the movement of the lens between the object and the stationary film, so that the image of different parts of the object or objects is produced progressively on the film, instead of having the entire object imaged upon the entire film at the same time, or imaged progressively on a traveling film, as has sometimes been done, and the term "cylindrical" applied to the film-support is not intended to limit the support to one constituting a complete cylinder.

I claim—

1. The combination of a cylindrical film-support with a lens-carrier and lens having a rotary movement about said film-support, which latter remains stationary during an exposure, substantially as described.

2. The combination of a cylindrical film-support with a lens-carrier, lens, and screen having a rotary movement about said film-support, the said screen having a longitudinal slit or opening between the lens and the film-support, substantially as described.

3. The combination of a cylindrical film-support with a lens-carrier and lens capable of rotary movement about said film-support, an actuator for producing such movement, and governor for regulating the speed of movement, substantially as described.

4. The combination of a stationary base and cylinder fastened thereto but detachable therefrom, with an annulus surrounding and engaged with said base and capable of rotation thereon as a bearing, and lens supported on said annulus and carried thereby around the stationary cylinder, substantially as and for the purpose described.

5. The combination of a cylindrical film-support with winding-drums for a web of film contained therein, a lens-carrier having a rotary movement around said film-support, a detent controlling said movement, provided with a marker for making a gage-mark on the film when the lens-carrier is released, substantially as described.

6. The combination of a cylindrical film-support with a lens-carrier having a rotary movement about the said film-support, a cylindrical lens supported in said lens-carrier and focusing longitudinally of said cylindrical support, and a screen interposed between the lens and film-support, having a narrow slit lengthwise of said film-support, substantially as described.

7. The combination of a cylindrical film-support with a lens-carrier and lens capable of rotary movement about said film-support, an actuator for producing such movement, a governor for regulating the speed of movement, and a detent for arresting and releasing the said lens-carrier, substantially as described.

In testimony whereof I have signed my name to this specification in the presence of two subscribing witnesses.

NEWTON CRANE.

Witnesses:
 JOS. P. LIVERMORE,
 JAS. J. MALONEY.